Figure 1:
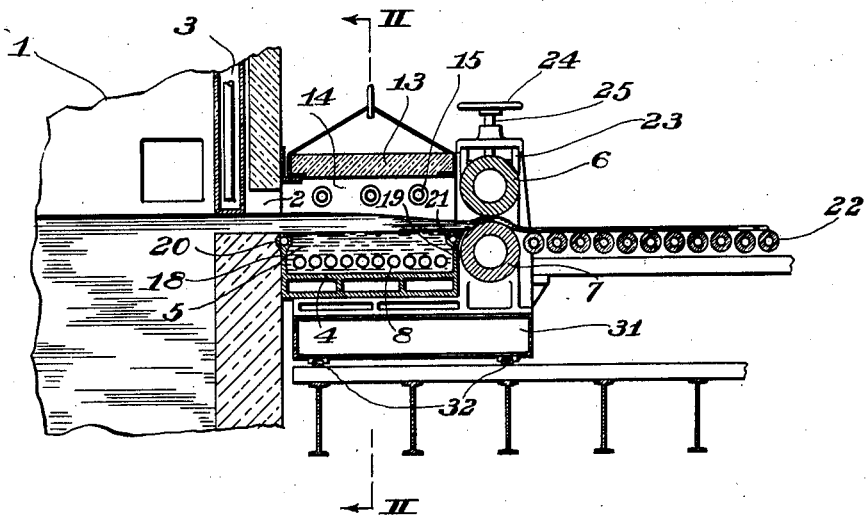

Dec. 8, 1925.

H. K. HITCHCOCK 1,564,240

PROCESS AND APPARATUS FOR MAKING SHEET GLASS

Filed Feb. 5, 1925   3 Sheets-Sheet 1

INVENTOR
Halbert K. Hitchcock
by James C. Bradley
Atty

Dec. 8, 1925.

H. K. HITCHCOCK 1,564,240

PROCESS AND APPARATUS FOR MAKING SHEET GLASS

Filed Feb. 5, 1925

3 Sheets-Sheet 3

INVENTOR

Patented Dec. 8, 1925.

1,564,240

UNITED STATES PATENT OFFICE.

HALBERT K. HITCHCOCK, OF PITTSBURGH, PENNSYLVANIA, ASSIGNOR OF ONE-HALF TO HITCHCOCK EXPERIMENT COMPANY, A CORPORATION OF NEW JERSEY.

PROCESS AND APPARATUS FOR MAKING SHEET GLASS.

Application filed February 5, 1925. Serial No. 7,037.

*To all whom it may concern:*

Be it known that I, HALBERT K. HITCHCOCK, a citizen of the United States, and a resident of Pittsburgh, in the county of Allegheny and State of Pennsylvania, have made a new and useful invention in Improvements in a Process and Apparatus for Making Sheet Glass, of which the following is a specification.

The present invention has to do with the formation of a sheet of glass directly and continuously from the molten glass in a tank without causing the bubbles in the glass to elongate and spread out so as to form a serious defect in the glass. It is extremely difficult to get a molten mass of glass that is absolutely free from small bubbles of gas or seeds in the body itself. If these seeds remain spherical, they are so small that they are not readily seen when looking through the sheet, but if they are drawn out into long strings, they form serious defects which greatly impair the quality of the glass and reduce its market value.

The present invention has for its principal object the provision of a process and apparatus which will enable the glass to be taken continuously from a tank furnace and run through a pair of sizing rolls without elongating the bubbles or seeds before alluded to. This is accomplished by allowing the glass to flow from the tank onto a liquid supporting bed where the glass spreads itself in sheet form of almost the required dimensions. This preliminary sheet is then passed between a pair of dimensioning or sizing rolls which reduce it to the thickness required and, as the glass is reduced very little in thickness during this rolling process, the bubbles are not seriously distorted. Heretofore, an attempt has been made to accomplish this by flowing the glass out onto a water cooled table, where it is allowed to spread itself out in sheet form, and then passing through dimensioning rolls. However, in order to drag the glass over this chilled table, the table has to be very cold, which causes the formation of a thick film of cold glass on the bottom, and this being incorporated with the hotter glass above, produces a defect known as "mechanical ream". This defect is hardly less objectionable than the elongated bubbles before alluded to. It is impossible to run a plate hot enough to prevent this defect from occurring because, if the plate is hot enough to prevent the formation of this film, the glass is so soft that it is stretched in pulling the bottom film or skin over it, and the platen also gets so hot that the glass sticks to it, thereby seriously interfering with the operation of the apparatus.

By the use of a liquid supporting bath having water cooling pipes passing therethrough, all these difficulties are obviated. In the first place, the glass flows over it without friction and the temperature can be controlled absolutely by means of the cooling pipes in the bath. Thermo-elements can be placed in the bath at various points and by having partitions in the bath coming up to near the surface of the liquid supporting bath, different temperatures can easily be maintained in various sections of the bath, so that the temperature of the superimposed glass body can be maintained at any temperature desired.

Figure 2:
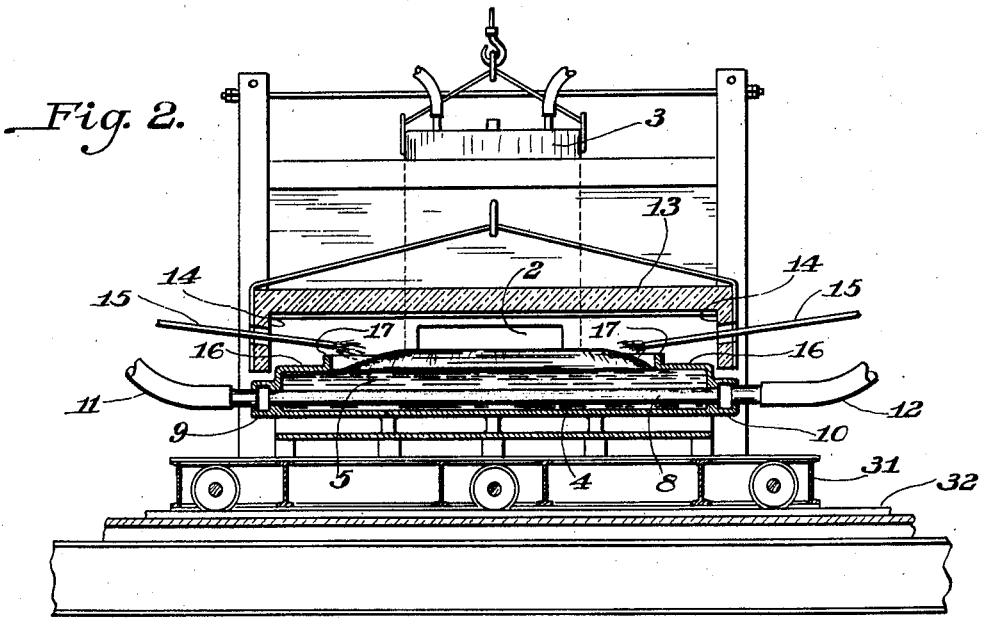
Figure 3:
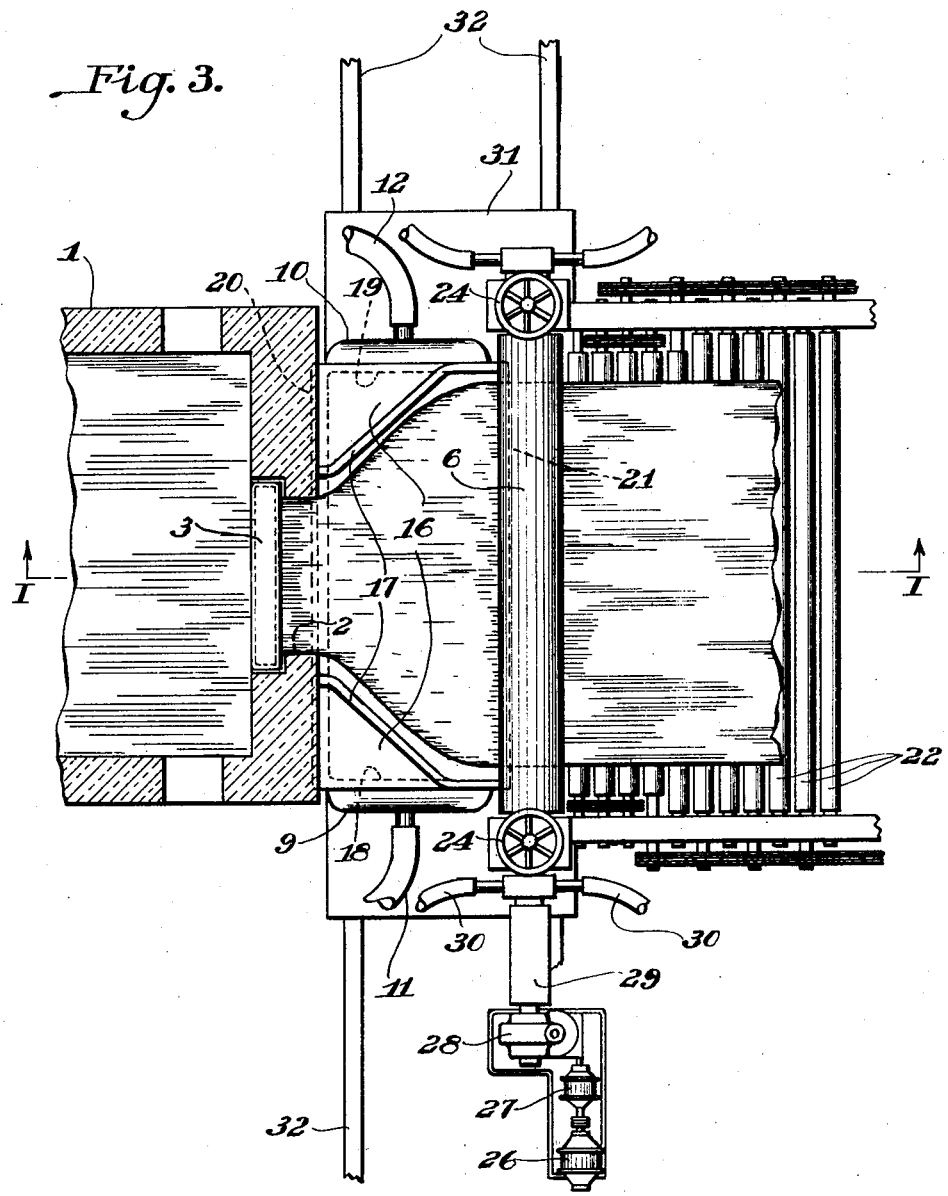
Figure 4:
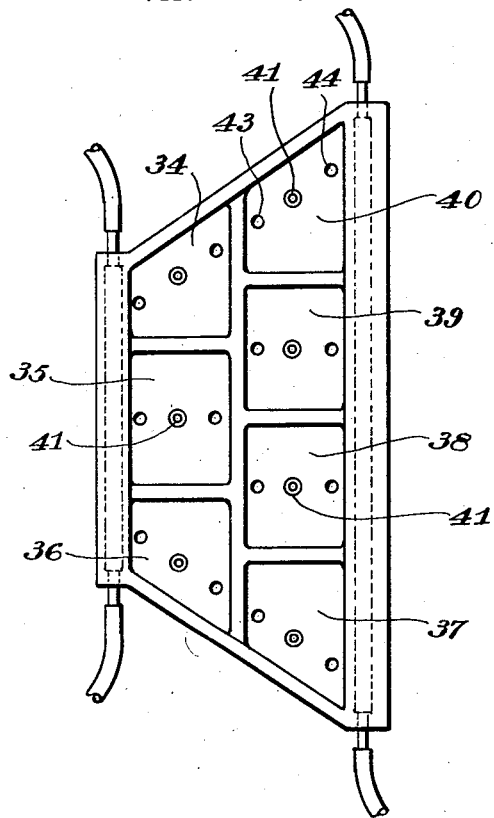
Figure 5:
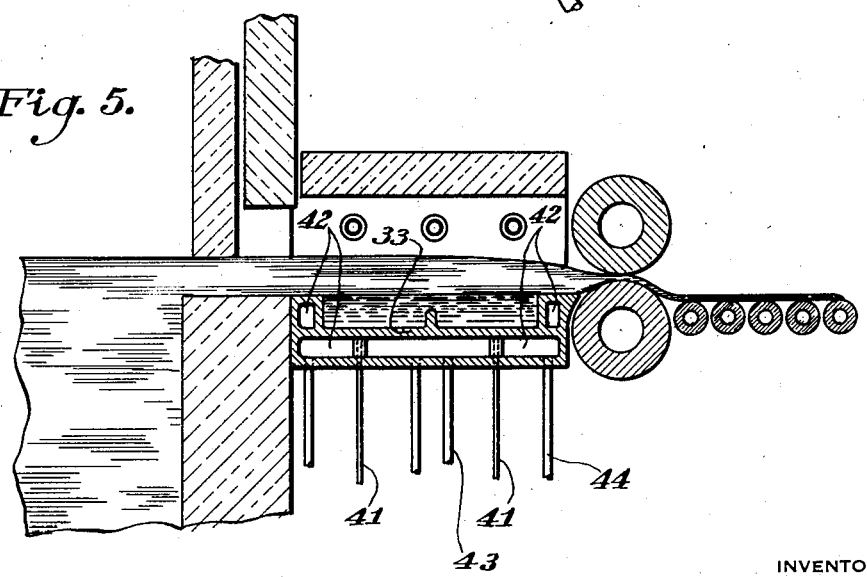

Another difficulty enters into the formation of the continuous sheet of glass which is easily overcome by the use of the process and apparatus herein described. It is necessary in order to prevent devitrification in the glass that it should be cooled as rapidly as possible through the range of temperature at which devitrification takes place, but at the same time, it is necessary not to chill it so rapidly as to produce mechanical ream before alluded to, or fire cracks, which are small checks in the surface of the glass. The present process and apparatus permits of a regulation or adjustment of temperatures so that exactly the required rate of cooling may be provided to avoid the devitrification on the one hand and the ream on the other hand. Certain embodiments of the invention are illustrated in the accompanying drawings wherein:

Figure 1 is a vertical longitudinal section through the apparatus and through the forward or delivery end of the glass tank, to which the apparatus is applied. Fig. 2 is a section on the line II—II of Fig. 1. Fig. 3 is a partial plan view and partial horizontal section through the construction of Fig. 1. And Figs. 4 and 5 illustrate a modification, Fig. 4 being a plan view and Fig. 5 being a vertical section.

Referring to the drawings, 1 is the forward or delivery end of a melting tank, preferably of the regenerative type having an outlet slot 2 through its side wall and being provided with a water cooled gate or cut-off member 3, supported from above and adapted to regulate the flow of glass through the slot and also to cut it off entirely when this becomes desirable or necessary.

Directly in front of the slot in position to receive the molten glass is a rectangular receptacle 4 carrying a bath 5 of molten metal, such as tin or lead, the upper surface of which is designed to act as a casting bed or table over which the glass passes in its progress to the sizing or dimensioning rollers 6 and 7 located at the forward end of the bath 5. The molten metal may be poured into the receptacle 4 before the withdrawal of any glass from the tank or if solidified, the passage of the glass over the metal serves to heat it and maintain it in molten condition.

In order to regulate the temperature of the molten metal in the bath, the pipes 8 are provided extending from the header 9 at one side of the table to the header 10 at the other side (Fig. 3). A circulation of cooling fluid, such as water or oil is supplied by means of the inlet pipe 11 and outlet pipe 12. If desired, the fluid may be cooled after its withdrawal and returned again for use and automatic regulating means may be supplied to give just the temperature conditions necessary in the metal bath. In order to give a further temperature regulation of the glass passing over the molten bath, a portable cover plate 13 is employed with suitable side walls 14 and gas burners 15, thus permitting of a regulation of the temperature conditions above the glass as well as below it.

As indicated in Fig. 3, the width of the slot 2 is only a fraction of the width of the table and only a fraction of the width of the glass sheet formed, the molten glass as it passes from the tank to the metal bath spreading out laterally in fan shape and finally reaching the sizing rolls 6 and 7 with a width approximately that of the finished sheet which it is designed to produce. In order to protect the surface of the molten metal in the receptacle 4 from the action of the air, the triangular cover plates 16 are employed at the surface of the glass, such cover plates being provided along their inclined edges with ridges or flanges 17, which may be utilized as guides for controlling the spreading action of the glass on the surface of the metal bath, although such guides are not necessary if a proper feed relation is maintained between the glass through the slot 2 and the feed of the glass between the sizing rolls 6 and 7. Due to the high temperature of the glass passing over the metal bath, the end walls 18 and 19 would become overheated at their upper edges and stick to the glass, if provision were not made for cooling them. This cooling effect is secured by providing the upper edges with hollow beads 20 and 21 through which a cooling circulation of liquid, such as water, may be maintained.

Forward of the container 4 with its molten bath are the sizing or dimensioning rolls 6 and 7, such rolls being adapted to deliver the glass sheet formed to the rolls 22 leading to a suitable leer through which the ribbon or sheet is continuously carried. The sizing rolls are mounted in suitable standards 23, the upper roll being adjustable vertically by means of the hand wheels 24 provided with screws 25 engaging blocks in which the ends of the rolls are journalled. The rolls are driven from a motor 26 (Fig. 3) operating through reducing gearing in the casings 27 and 28, the ends of the rolls being connected to the operating gears in the casing 28 by means of suitable tumbler shafts 29. The sizing rolls are preferably cooled by means of water supplied through the pipes 30 connected to swivels at the ends of the roll shafts.

In order to provide for the removal of the sheet forming apparatus from the front of the tank, the molten bath and the sizing rolls are carried upon a car 31 mounted upon the transversely extending track 32.

Fig. 4 illustrates a modification which differs from that of Fig. 1 in that the container 33 for the molten bath of metal is divided into compartments or pockets 34 to 40, the partitions between the pockets or compartments extending to a point just short of the surface of the metal bath as indicated in Fig. 5. This provides a means for giving an independent regulation to different portions of the bath, the temperature of the metal in the pockets 34, 35 and 36 being preferably somewhat higher than that in the pockets 37 to 40. The temperature of the metal is determined by means of suitable thermo-couples 41 and a flow of water is provided through the hollow pockets 42 to give the required degree of regulation in the metal of the various pockets, each pocket being provided with suitable inlet and outlet pipes, such as 43 and 44, to which automatic regulating means may be applied, if desired. In other respects, the construction is similar to that of Figs. 1 to 3.

The advantages of the casting table consisting of a molten bath as compared with a casting table of solid metal have already been pointed out and will now be readily understood. The molten bath can be run at a temperature much higher than is possible where a solid table is employed, since the friction involved in dragging the glass over the table is so slight because of the liquid support, that only a thin skin of toughened glass is required upon the lower surface of the body of glass upon the table, as the resistance to the forward movement of the glass is so reduced that no stretching will occur. As a result, the avoidance of the mechanical ream incident to the use of a solid table with its necessarily heavy chill is avoided, as well as the fire cracks incident to such heavy chill. It is also possible to adjust the temperature of the molten bath so that any danger of devitrification is avoided. Other advantages of the construction will be readily apparent to those skilled in the art.

What I claim is:

1. The process of continuously forming a glass ribbon or sheet, which consists in flowing the glass from a tank onto a molten bath of metal, causing it to spread out laterally and move forward over such bath, and then rolling it to a definite thickness and carrying it forward continuously.

2. The process of continuously forming a glass ribbon or sheet, which consists in flowing the glass from a tank onto a molten bath of metal, of a temperature less than that of the glass, causing it to spread out laterally and move forward over such bath at a progressively decreasing temperature, and then rolling it to a definite thickness and carrying it forward continuously.

3. The process of continuously forming a glass ribbon or sheet, which consists in flowing the glass from a tank onto a molten bath of metal, causing it to spread out laterally and move forward over such bath, and gradually decrease in thickness, and then applying rolling pressure to the glass to still further reduce its thickness and feed it forward.

4. The combination with a glass tank having an outlet slot, of a molten bath of metal in position to receive the glass from the slot of a width greater than said slot, and a pair of rolls, at least one of which is driven, located at the forward end of said metal bath in position to receive the glass and feed it forwardly.

5. The combination with a glass tank having an outlet slot, of a molten bath of metal in position to receive the glass from the slot of a width greater than said slot, and a pair of rolls, at least one of which is driven, located at the forward end of said metal bath in position to receive the glass and feed it forwardly, and of a length greater than the width of said table.

6. The combination with a glass tank having an outlet slot, of a molten bath of metal in position to receive the glass from the slot of a width greater than said slot, a pair of cooled sizing rolls, at least one of which is driven, located at the forward end of the metal bath in position to receive the glass and feed it forwardly, and temperature regulating means for said bath.

7. The combination with a glass tank having an outlet slot, of a molten bath of metal in position to receive the glass from the slot of a width greater than said slot, a pair of cooled sizing rolls, at least one of which is driven, located at the forward end of the metal bath in position to receive the glass and feed it forwardly, and temperature regulating means located above the surface of said bath.

8. The combination with a glass tank having an outlet slot, of a molten bath of metal in position to receive the glass from the slot of a width greater than said slot, a pair of sizing rolls, at least one of which is driven, located at the forward end of said metal bath, a cover over said bath, and means for applying heat intermediate said cover and the bath.

9. The combination with a glass tank having an outlet slot, of a molten bath of metal in position to receive the glass from the slot of a width greater than said slot, a pair of sizing rolls, at least one of which is driven, located at the forward end of said metal bath, a cover over said bath, means for applying heat intermediate said cover and the bath, and temperature regulating means for said bath.

10. The combination with a glass tank having an outlet slot, of a molten bath of metal in position to receive the glass from the slot of a width greater than said slot, a pair of sizing rolls, at least one of which is driven, located at the forward end of said metal bath, a cover over said bath, and cooling means for regulating the temperature of said bath.

11. The combination with a glass tank having an outlet slot, of a molten bath of metal in position to receive the glass from the slot of a width greater than said slot, a pair of sizing rolls, at least one of which is driven, located at the forward end of said metal bath, a cover over said bath, and fluid cooled pipes extending through the bath for regulating its temperature.

12. The combination with a glass tank having an outlet slot, of a molten bath of metal in position to receive the glass from the slot of a width greater than said slot, a pair of cooled sizing rolls, at least one of which is driven, located at the forward end of the metal bath in position to receive the glass and feed it forwardly, and means for regulating the flow of glass through said slot.

13. The combination with a glass tank having an outlet slot, of a molten bath of metal in position to receive the glass from the slot of a width greater than said slot, a pair of cooled sizing rolls, at least one of which is driven, located at the forward end of the metal bath in position to receive the glass and feed it forwardly, and a gate lying inside the tank above said slot for regulating the flow of glass therethrough.

14. The combination with a glass tank having an outlet slot, a container in advance of said slot provided with a molten bath of metal in position to receive the molten glass from said slot, a pair of rolls, at least one of which is driven, at the forward end of said container in position to receive the glass and size it and feed it forwardly, and means for cooling the forward and rear ends of such container at the upper edges thereof.

15. The combination with a glass tank having an outlet slot, a container in advance of said slot provided with a molten bath of metal in position to receive the molten glass from said slot, a pair of rolls, at least one of which is driven at the forward end of said container in position to receive the glass and size it and feed it forwardly, and water cooling means for the forward and rear ends of such container at the upper edges thereof.

16. The combination with a glass tank having an outlet slot, a container in advance of said slot provided with a molten bath of metal in position to receive the molten glass from said slot, upright walls dividing the container into a plurality of compartments, means for independently regulating the temperature of the metal in the compartments, and a pair of rolls, at least one of which is driven at the forward end of said container in position to receive the glass and size it and feed it forwardly.

17. The combination with a glass tank having an outlet slot, of a molten bath of metal in position to receive the glass from the slot of a width greater than said slot, a pair of sizing rolls at the forward end of said metal bath, and inclined guide means for the glass at the surface of the metal bath on each side thereof.

18. The combination with a glass tank having an outlet slot, of a molten bath of metal in position to receive the glass from the slot of a width greater than said slot, a pair of sizing rolls at the forward end of said metal bath, and angular cover plates extending over the rear corner portions of the metal bath at the surface thereof.

In testimony whereof, I have hereunto subscribed my name this 16th day of January, 1925.

HALBERT K. HITCHCOCK.